Oct. 15, 1940.        H. M. DODGE        2,217,892
STRIKER PLATE
Filed April 30, 1938

INVENTOR
*Howard M. Dodge*
BY
*Evans + McCoy*
ATTORNEYS

Patented Oct. 15, 1940

2,217,892

UNITED STATES PATENT OFFICE 2,217,892

STRIKER PLATE

Howard M. Dodge, Wabash, Ind., assignor to The General Tire & Rubber Company, Akron, Ohio, a corporation of Ohio Application April 30, 1938, Serial No. 205,271

3 Claims. (Cl. 292—340)

This invention relates to an improved striker plate of the character used with the latch bolt of an automobile door. It is an object of the invention to provide an improved striker plate of this type which is resilient and yielding and which minimizes the noise and wear attendant upon closing of an automobile door.

A more specific object is to provide an automobile door striker plate having a resilient body member, the central portion of which is placed under tension when the striker plate is secured in place to effect a quieter operation of the door latch mechanism and other beneficial results.

Other objects and advantages will become apparent from the following detailed description of a suitable embodiment of the invention illustrated in the accompanying drawing, in which.

Figures 1, 2:
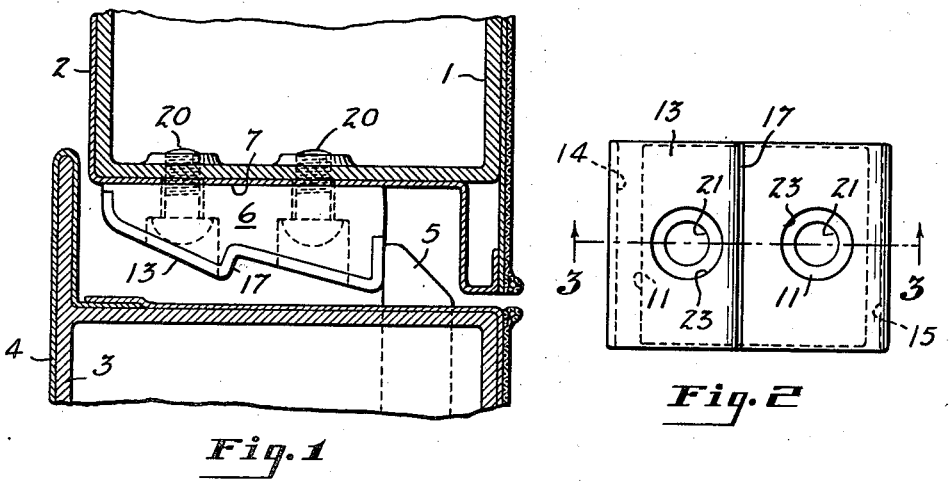
Figure 1 is a fragmentary sectional view, with parts removed, through a door and door frame of an automobile body showing my improved striker plate in position.
Fig. 2 is an elevational view of my improved striker plate.

In the drawing like parts throughout the several views have been indicated by the same numerals of reference. Referring to Fig. 1, a door framing member 1 disposed inside the automobile body paneling 2 defines a doorway in which is hung a door having a frame 3 and paneling 4. A suitable latch mechanism (not shown) operates a sliding latch bolt 5 which engages a striker plate, indicated generally by the numeral 6, secured against a striker plate seat 7 formed on the door framing member 1.

The striker plate has a resilient and yieldable body portion 10 (Fig. 3) preferably formed of a relatively soft and elastic rubber composition and configured to the desired shape of striker plate. Embedded in the resilient rubber body of the striker plate is a relatively rigid reinforcing member 11 which may be suitably formed of metal. The reinforcing member is preferably a relatively flat plate and the sides thereof are of less area than the resilient rubber body portion 10 so that portions 12 of the rubber 10 extend around the marginal edges of the reinforcing member 11.

A wear-resisting face plate 13 is adhesively secured to one side of the rubber body portion 10 by suitable means such as vulcanization and in overlying relation with respect to the rigid reinforcing member 11. The face plate has front and rear flange portions 14 and 15, respectively, directed toward the striker plate seat 7, and which extend down the front and rear sides of the rubber body 10 and are secured thereto by vulcanization. The marginal edges of the flanges 14 and 15 are spaced from the striker plate seat 7 by cushion portion 16 of the rubber body 10.

It is to be noted that as an important feature of the invention there is no interlocking of the sheet metal face plate 13 and the metal reinforcing member 11 so that the face plate is secured in place solely by adhesion to the resilient rubber body 10, effected by vulcanization.

Preferably the striker plate is of the double latch type presenting a main shoulder along the rear side thereof and formed by the flange 15 of the plate 13 to be engaged by the latch bolt 5 when the vehicle door is fully closed as illustrated in Fig. 1. A secondary or safety shoulder 17 is formed intermediate the flanges 14 and 15 of the face plates and parallel with respect to the shoulder 15. This safety shoulder engages the latch bolt 5 to prevent opening of the vehicle door in the event that the latter is not fully closed.

Between the flange 14 and safety shoulder 17 is an inclined latch engaging surface 18 and between the shoulder 17 and flange 15 is an inclined latch engaging surface 19 which is parallel to the latch engaging surface 18. In closing the vehicle door the surfaces 18 and 19 exert a resilient wedging action on the end of the latch bolt 5 causing the latter to slide longitudinally in a downward direction as viewed in Fig. 1 until released by riding over the shoulder 17 or flange 15.

The striker plate is secured in place against the seat 7 by means of machine screws 20 which pass through apertures 21 in the reinforcing plate 11 and apertures 22 in the portion of the rubber body 10 disposed between the reinforcing plate 11 and seat 7. The shanks of the screws 20 are threaded into holes in the striker plate seat 7 so that the reinforcing member 11 may be drawn tightly against the striker plate seat by means of the screws 20. Enlarged openings or counterbores 23 are formed through the sloping portions 18 and 19 of the face plate 13 and the portion of the rubber body 10 disposed between the face plate and the reinforcing member 11. These counterbores extend to the surface of the reinforcing member 11 and receive the heads of the screws 20 so that they may bear directly against the reinforcing member.

Figure 3:
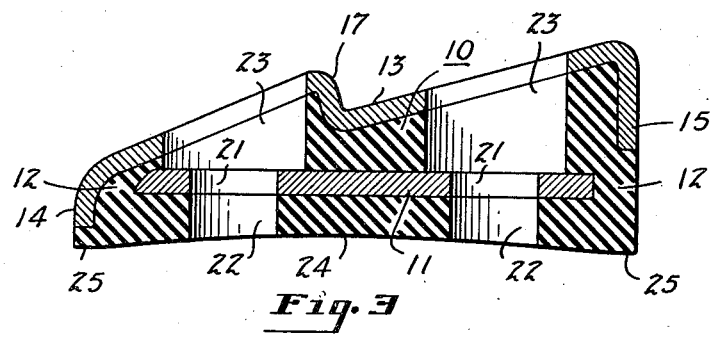
Fig. 3 is an enlarged sectional view taken substantially on the line 3—3 of Fig. 2.
Figure 4:
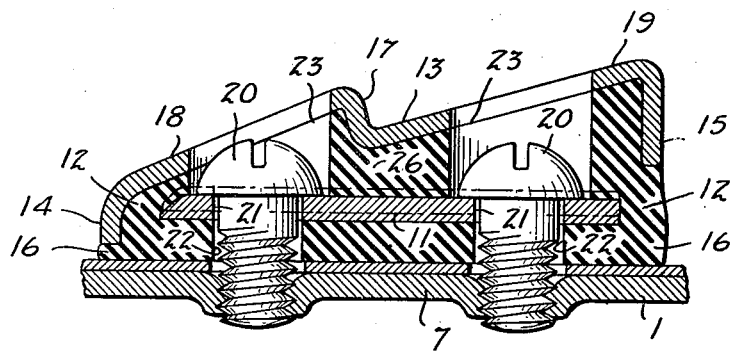
Fig. 4 is an enlarged sectional detail showing the striker plate secured to the striker plate seat of an automobile door frame such as that of Fig. 1.

The portion of the resilient body 10 that is disposed against the striker plate seat 7 is formed with a hollowed out or dished surface as indicated at 24 of Fig. 3. Accordingly, in applying the striker plate to the striker plate seat of a door frame, marginal portions 25 of the resilient body 10 first engage the striker plate seat and upon tightening the screws 20 the resilient rubber cushions 16, between the marginal portions 25 and the edges of the flanges 14 and 15, are compressed. This compressing of the marginal portions of the resilient cushion body 10 is accompanied by a stretching of the central portion 26 thereof disposed between the face plate 13 and the reinforcing member 11. This compressing and stretching action is illustrated in Fig. 4 in which the broken lines indicate the position of the reinforcing plate 11 before tightening the screws 20 and the full lines indicate the position of the parts after the screws 20 have been tightened and the striker plate is secured in position.

The compression of marginal portions of the rubber cushion body between the flanges of the facing plate 13 and the striker plate seat, forms a firm abutment against which the spring pressed latch bolt may act when the door is closed. A striker plate constructed in accordance with the present invention exhibits improved operating characteristics. It is quieter in operation than previously known types and a full floating action is obtained since the face plate 13 is secured in place solely by adhesion to the rubber body portion 10.

In addition to permitting the opening and closing of an automobile door with a minimum of noise and wear on the latch part, the striker plate of the present invention, by reason of the increased pressure with which marginal portions 25 of the rubber body portion 10 are forced against the striker plate seat 7, permits less dirt and other foreign material to work its way under the rubber cushion into the threaded portion of the screws 20, so that the latter are less apt to become rusted and the deleterious effects on the door framing member 1 in the region of the striker plate seat 7 are reduced.

Although but a single embodiment of the invention has been shown and described, the principles involved can be incorporated in numerous modifications, change being made in the details as desired, it being understood that the embodiment shown is given for purposes of illustration and explanation.

What I claim is:

1. A striker construction for door latch bolts comprising a resilient body of yieldable composition, a rigid reinforcing member substantially imbedded in the body, a seat for mounting the body, said seat and body having their contacting surfaces shaped so that when the unstressed body is disposed against the seat, marginal portions of the body contact the seat while a central portion of the body is spaced from the seat and the reinforcing member is spaced from the seat with said marginal and central body portions interposed between the member and seat, a wear resisting face plate secured to the body, and means for securing the striker to the seat, said securing means being adapted to draw the reinforcing member toward the seat until the central body portion is in engagement therewith and to compress the marginal body portions to a greater degree than the central body portions.

2. A striker construction for door latch bolts comprising a seat, a resilient body of yieldable composition disposed against the seat, a rigid reinforcing member substantially imbedded in the body and disposed in spaced substantially parallel relation to the seat with portions of the body interposed therebetween, a face member adhesively secured to the body in overlying relation with respect to the reinforcing member and separated therefrom by portions of the body, said face member having flanges at opposite ends extending over the sides of the body toward the seat and separated from the latter by cushion portions of the body disposed beyond the marginal edges of the reinforcing member, aligned apertures through the body, reinforcing member and face member, and means engageable with the reinforcing member to draw the latter toward the seat, said body member having its seat engaging face shaped so that when the body is placed thereagainst the seat is first engaged by said cushion portions and at initial engagement between the cushion portions and seat the central part of said face is spaced from the seat, whereby upon said drawing of the reinforcing member toward the seat to close the space between the seat and said central part of the face the cushion portions are compressed and resiliently hold the flange ends away from the seat, and said portions of the body between the reinforcing member and face member are tensioned.

3. A striker construction for door latch bolts comprising in combination, a seat, a resilient body of rubber disposed against the seat, said seat and body being formed so that in the unstressed shape of the body only the marginal portions of the body contact the seat and the middle part of the body is spaced from the seat, a relatively rigid reinforcing member substantially imbedded in the body and held in spaced relation to the seat by the body, said marginal portions of the body extending beyond the edges of the reinforcing member, a wear resisting face plate secured to the body and separated thereby from the reinforcing member and the seat, said plate having end portions which extend beyond the edges of the reinforcing member and overlie the marginal portions of the body, there being a central portion of the body between and secured to the plate and the reinforcing member, and means for drawing the reinforcing member toward the seat to compress the marginal portions of the body and to secure the striker to the seat, said compressed marginal portions of the body restraining the movement of the face plate toward the seat to thereby tension said central portion of the body.

HOWARD M. DODGE.